United States Patent
C. R. et al.

(10) Patent No.: US 9,542,625 B2
(45) Date of Patent: Jan. 10, 2017

(54) MULTI RANGE OBJECT DETECTION DEVICE AND METHOD

(71) Applicant: Tata Consultancy Services Limited, Mumbai, Maharashtra (IN)

(72) Inventors: Manoj C. R., Karnataka (IN); Thiyagarajan Paramasivam, Karnataka (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 14/642,269

(22) Filed: Mar. 9, 2015

(65) Prior Publication Data

US 2015/0254531 A1    Sep. 10, 2015

(30) Foreign Application Priority Data

Mar. 7, 2014  (IN) .......................... 794/MUM/2014

(51) Int. Cl.
  *G06K 9/62*  (2006.01)
  *G06K 9/00*  (2006.01)
  *G06K 9/46*  (2006.01)

(52) U.S. Cl.
  CPC ......... *G06K 9/6269* (2013.01); *G06K 9/00798* (2013.01); *G06K 9/00805* (2013.01); *G06K 9/4604* (2013.01); *G06K 9/4647* (2013.01)

(58) Field of Classification Search
  CPC  G06K 9/6269; G06K 9/00805; G06K 9/4604; G06K 9/00798; G06K 9/4647
  See application file for complete search history.

(56) References Cited

U.S. PATENT DOCUMENTS

| 8,463,044 B2 | 6/2013 | Meng et al. |
| 2011/0255741 A1* | 10/2011 | Jung .................. G06K 9/00369 |
| | | 382/103 |

FOREIGN PATENT DOCUMENTS

| CN | 103268363 A | 8/2013 |
| JP | 2010267055 A | 11/2010 |

OTHER PUBLICATIONS

A. Shashua, Y. Gdalyahu and G. Hayun, "Pedestrian detection for driving assistance systems: single-frame classification and system level performance," Intelligent Vehicles Symposium, 2004 IEEE, 2004, pp. 1-6. doi: 10.1109/IVS.2004.1336346.*

(Continued)

*Primary Examiner* — Siamak Harandi
*Assistant Examiner* — Kate R Duffy
(74) *Attorney, Agent, or Firm* — Shumaker, Loop & Kendrick, LLP (57) ABSTRACT

The present disclosure discloses device and method for detecting objects placed at multiple ranges from vehicle. Images of the objects may be captured by an image capturing unit housed in the vehicle. The image may be splitted into plurality of sub-images. Further, one or more features may be extracted from the plurality of sub-images. Further, each of the plurality of sub-images may be simultaneously processed for computing gradients associated with the plurality of sub-images. Further, a cell histogram may be created by casting weighted vote for an orientation based histogram channel based on values associated with the gradient. The gradients computed may be normalized by grouping the cells in spatial blocks. Further, a Support vector Machine (SVM) linear classifier may be applied on the plurality of sub-images in order to classify the near object and the far object in a category of a pedestrian or a vehicle.

10 Claims, 4 Drawing Sheets

(56) References Cited

OTHER PUBLICATIONS

Cong Hou, Haizhou AI, Shihong Lao, "Multiview Pedestrian Detection Based on Vector Boosting"; ACCV 2007, Part I, LNCS 4843, p. 210-219 (10 pages).
Takuya Kobayashi, Akinori Hidaka, Takio Kurita; "Selection of Histograms of Oriented Gradients Features for Pedestrian Detection"; Japan; ICONIP 2007, Part II, LNCS 4985, pp. 598-607 (10 pages).

* cited by examiner

MULTI RANGE OBJECT DETECTION DEVICE AND METHOD

CROSS-REFERENCE TO RELATED APPLICATIONS AND PRIORITY

The present application claims priority to Indian Provisional Patent Application No. 794/MUM/2014, filed on Mar. 7, 2014, the entirety of which is hereby incorporated by reference.

TECHNICAL FIELD

The present disclosure described herein, in general, relates to multi-range object detection method and a device.

BACKGROUND

In transportation systems, the issue of ensuring driving safety and driver assistance is an important requirement. One of the factors which are responsible for the road accidents is either driver's ignorance or reduced range of vision. Conventional safety features like seat belts, airbags, Anti-lock braking system (ABS) are available for reducing severity of the accidents. Further, other safety features available today include driver-assistance systems helping the driver to avoid accidents by providing early alerts to the driver and if required taking over the control of a vehicle from the driver.

One of such driver-assistance systems may include collision avoidance system enabled for detecting objects in the path of the vehicle and alerting the driver. For detecting the objects, images may be captured and further processed for detecting an actual position of the objects from the vehicle. However, present techniques available for providing the collision avoidance system are capable of detecting the objects, one at a time, either placed at a far range or at a near range from the vehicle. Thus, the present driver-collision avoidance system face technical challenge of detecting the objects placed at the far range and the near range from the vehicle simultaneously. Additionally, the computation of objects, by the existing systems, at different ranges (far and near) requires more computational time which may further lead in delaying the response provided in form of notification alerts to the driver.

SUMMARY

This summary is provided to introduce aspects related to devices and methods for detecting objects at multiple ranges and the concepts are further described below in the detailed description. This summary is not intended to limit the scope of the disclosure.

In one implementation, a device for detecting objects at multiple ranges simultaneously on a path of a vehicle is disclosed. The device comprises a processor and a memory coupled to the processor. The processor executes a plurality of modules stored in the memory. The plurality of modules comprises a receiving module, a splitting module, and a detection module. The receiving module may receive an image as an input corresponding to objects appearing on the path of the vehicle. Further, the splitting module may split the image into a plurality of sub-images indicating region of interest (ROIs). Further, each of the plurality of sub-images is in a form of a rectangular window of pixels computed based on distance of the objects from the vehicle. Further, the detecting module may detect a near object and a far object from the plurality of sub-images by extracting one or more features from the plurality of sub-images. Further, the detecting module may simultaneously process each of the plurality of sub-images for computing gradient associated with the each of the plurality of sub-images based on the one or more features extracted. Further, the detecting module may create cell histograms comprising plurality of cells by casting weighted vote for an orientation based histogram channel based on values associated with the gradient computed. Further, the detecting module may normalize the gradients computed by grouping the cells of the plurality of cells in spatial blocks in order to normalize the plurality of sub-images. Further, the detecting module may apply a Support vector Machine (SVM) linear classifier on the plurality of sub-images after being normalized in order to classify the near object and the far object in a category of a pedestrian or a vehicle.

In another implementation, a method for detecting objects at multiple ranges simultaneously on a path of a vehicle is disclosed. The method may comprise receiving, by a processor, an image as an input corresponding to objects appearing on the path of the vehicle. The method may further comprise a step of splitting, by the processor, the image into a plurality of sub-images indicating region of interest (ROIs). Further, each of the plurality of sub-images is in a form of a rectangular window of pixels computed based on distance of the objects from the vehicle. The method may further comprise a step of detecting, by the processor, a near object and a far object from the plurality of sub-images by extracting one or more features from the plurality of sub-images. Further, the method may comprise a step for simultaneously processing each of the plurality of sub-images for computing gradient associated with the each of the plurality of sub-images based on the one or more features extracted. Further, the method may comprise a step for creating cell histograms comprising plurality of cells by casting weighted vote for an orientation based histogram channel based on values associated with the gradient computed. The method may comprise a step for normalizing the gradients computed by grouping the cells of the plurality of cells in spatial blocks in order to normalize the plurality of sub-images. Further, the method may comprise a step for applying a Support vector Machine (SVM) linear classifier on the plurality of sub-images after being normalized in order to classify the near object and the far object in a category of a pedestrian or a vehicle.

Yet in another implementation a non-transitory computer readable medium embodying a program executable in a computing device for detecting objects at multiple ranges simultaneously on a path of a vehicle is disclosed. The program may comprise a program code for receiving an image as an input corresponding to objects appearing on the path of the vehicle. The program may further comprise a program code for splitting the image into a plurality of sub-images indicating region of interest (ROIs). Further, each of the plurality of sub-images is in a form of a rectangular window of pixels computed based on distance of the objects from the vehicle. The program may further comprise a program code for detecting a near object and a far object from the plurality of sub-images by: extracting one or more features from the plurality of sub-images, simultaneously process each of the plurality of sub-images for computing gradient associated with the each of the plurality of sub-images based on the one or more features extracted, creating cell histograms comprising plurality of cells by casting weighted vote for an orientation based histogram channel based on values associated with the gradient computed, normalizing the gradients computed by grouping the cells of the plurality of cells in spatial blocks in order to normalize the plurality of sub-images and applying a Support vector Machine (SVM) linear classifier on the plurality of sub-images after being normalized in order to classify the near object and the far object in a category of a pedestrian or a vehicle.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Devices and methods for detecting objects at multiple ranges simultaneously on a path of a vehicle are described. While driving on the road, different objects like vehicle, pedestrian, an animal or any other object may come in front of the vehicle. For driving safely, it is required to detect the position of these objects before it get too close to the vehicle. According to embodiments of present disclosure, one or more onboard cameras or image capturing units installed on the vehicle may capture the images of the objects appearing at multiple ranges from the vehicle. The objects may be placed at a near distance and far distance from the vehicle. The device disclosed in the present disclosure may be capable for simultaneously detecting the objects placed at the near distance and at the far distance, thus providing the multi-range object detection.

The image of the objects captured by an image capturing unit may be processed by the device at different stages. The input image frame captured by the unit is first split into multiple images slices of images indicating region of interests (ROI). The processing may be performed upon the multiple images in order to reduce the noise, isolate the individual elements, join the disconnected parts, sharpen the edges, and smoothening the multiple images using smoothening filters. After processing the images through the different stages, one or more features may be extracted. Based on the one or more features, gradient may be computed simultaneously corresponding to each of these multiple images. Further, cell histograms may be created based on values associated with the gradient. The cell histogram may be created by casting weighted vote for an orientation based histogram channel. Further, the gradients computed may be normalized by using normalizing factor in order to reduce the effect of changes in illumination and contrast from the images. After the normalization, a Support Vector Machine (SVM) linear classifier may be deployed for simultaneously classifying the near object and the far object in a category of a pedestrian or a vehicle. Thus, different objects placed at multiple ranges (near objects and far objects) from the vehicle may be detected simultaneously by the device. The detection of the objects at multiple ranges may be used for vehicle's safety.

While aspects of described device and method for detecting objects at multiple ranges simultaneously may be implemented in any number of different computing devices, environments, and/or configurations, the embodiments are described in the context of the following exemplary devices.

Figure 1:
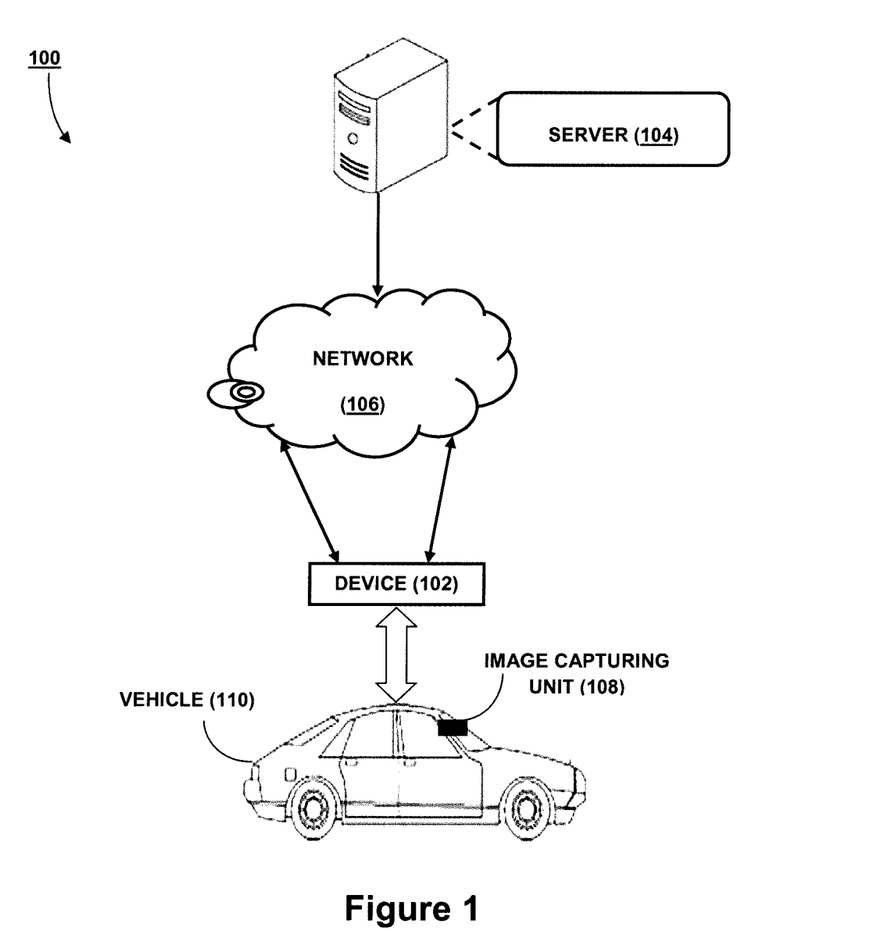
FIG. 1 illustrates a network implementation of a server and a device for detecting objects at multiple ranges, in accordance with an embodiment of the present disclosure.

Referring to FIG. 1, a network implementation 100 of a server 104 and a device 102 for simultaneously detecting the objects at multiple ranges is illustrated, in accordance with an embodiment of the present disclosure. In one embodiment, the device 102 facilitates the detection of the one or more objects in a path of a vehicle 110. Although the present disclosure is explained considering that the server 104 is implemented as a computing system, it may be understood that the server 104 may also be implemented as a variety of computing systems, such as a laptop computer, a desktop computer, a notebook, a workstation, a mainframe computer, a server, a network server, a tablet, a mobile phone, and the like. In one implementation, the server 104 may be implemented in a cloud-based environment. According to an embodiment, the device 102 may be implemented with the vehicle 110. Further, the server 104 may track the activities of the device 102, and the device 102 is communicatively coupled to the server 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
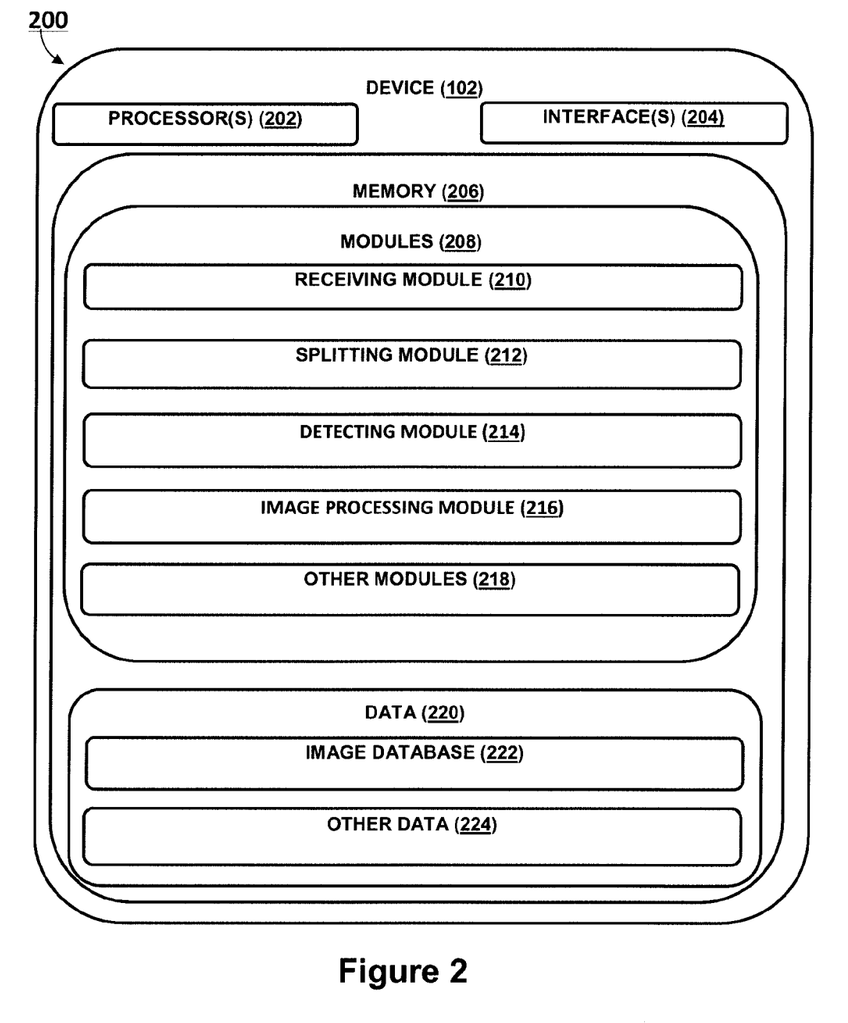
FIG. 2 illustrates the device, in accordance with an embodiment of the present disclosure.

Referring now to FIG. 2, the device 102 is illustrated in accordance with an embodiment of the present disclosure. In one embodiment, the device 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the device 102 to interact with a user directly or through the client devices 104. Further, the I/O interface 204 may enable the device 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 220.

The modules 208 include routines, programs, objects, components, data structures, etc., which perform particular tasks or implement particular abstract data types. In one implementation, the modules 208 may include a receiving module 210, a splitting module 212, detecting module 214, an image processing module 216, and other modules 218. The other modules 218 may include programs or coded instructions that supplement applications and functions of the device 102.

The data 220, amongst other things, serves as a repository for storing data processed, received, and generated by one or more of the modules 208. The data 220 may also include an image database 222, and other data 224.

Figure 3:
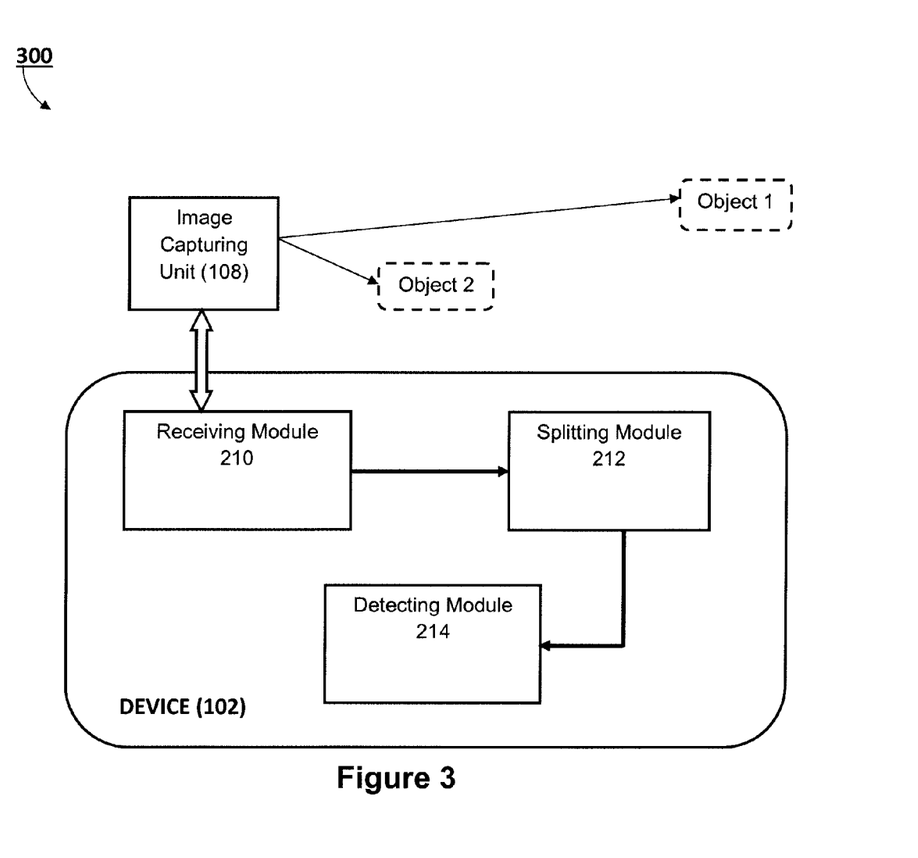
FIG. 3 illustrates a detailed working of the device, in accordance with an embodiment of the present disclosure.

Referring now to FIG. 3 illustrates detailed working of the device 102, in accordance with an embodiment of the present disclosure. The device 102 disclosed in the present disclosure may be implemented with any type of vehicle. In a present scenario, a four-wheeler vehicle is shown (FIG. 1) i.e., vehicle 110. The device 102 is provided for detecting objects at a near and far distance (i.e., multiple ranges) from the vehicle 110 in order to avoid collision of the vehicle 110 with the object. While the vehicle 110 is in the motion, it is extremely important to accurately detect the objects in the path of the vehicle 110. The objects may appear at near as well as far distance from the vehicle 110. Further, the objects may be in a still or a moving position. In one example, object 1 is placed at a far distance and object 2 is placed at near distance from the vehicle 110 as shown in FIG. 3. Thus, at the same time the detection of the objects placed at the far distance (object 1) as well as the near distance (object 2) from the vehicle 110 may be required. The device 102 of the present disclosure facilitates a simultaneous detection of the objects at the near and the far distance from the vehicle 110. Further, according one embodiment of present disclosure, the far distance ranges up to 80 meters, and the near distance ranges up to 5 meters. It must be noted to a person skilled in art that the ranges corresponding to near and far distance from the vehicle 110 may vary and the present disclosure is not limited to aforementioned ranges of the far distance and the near distance.

According to embodiments of present disclosure, an image of the object 1 and the object 2 may be captured by an image capturing unit 108 of the vehicle 110. The image capturing unit 108 may be a mono or stereo type camera (pair of imagers) used for capturing the images of one or more objects placed at the near and the far distance from the vehicle 110. The images captured may be stored in an image database 220 of the device 102. The receiving module 210 of the device 102 may receive the image corresponding to the objects appearing on the path of the vehicle 110. At first, the splitting module 212 of the device 102 may split the image received into a plurality of sub-images/slices indicating region of interest (ROIs). Further, each sub-image of the plurality of sub-images may be in a form of rectangular windows of pixels computed based on distance of the detection (i.e., distance between the objects and the vehicle 110). Since the objects looks bigger in short distance range and smaller in long distance range, there may be a big rectangular window corresponding to short range of distance, and a smaller rectangular window corresponding to long range of distance. In one exemplary embodiment, a range for the region of interest (ROI) may be defined such that a sub-image located at a distance up to 20 meters, 50 meters 80 meters, from the vehicle 110, may be sliced into ROI1, ROI2, and ROI3 respectively. The above example of the range defined for the ROIs may be applicable for VGA type camera. It may be noted to a person skilled in art that, the distance of detection (i.e., ranges defined for ROIs) may improve with resolution of the camera and further the ROI selection may vary accordingly.

Since, the objects at the longer distance, for example 50 meters, may be perceivably smaller in size, it may become difficult to detect the object image at the original scale. The image processing module 216 of the device 102 may enlarge one or more sub-images of the plurality of sub-images based on the distance of the near object and the far object from the vehicle. According to embodiments of present disclosure, the one or more sub-images may be enlarged in size by using a bilinear interpolation method to 2× times the original of the ROI2, and may be 3× times the original of the ROI3. After interpolation of the one or more sub-images, the image processing module 216 may apply erosion followed by dilation upon the interpolated one or more sub-images. The application of the erosion and the dilation may result in reduction in a noise of the one or more sub-images, isolation of individual elements, and joining of disconnected parts in the one or more sub-images. Further, the dilation may involve convoluting of the one or more sub-images with a kernel which is a circle. The kernel may be scanned over the one or more sub-images and finds the maximum pixel value overlapped by the kernel and replaces the pixel value with the maximum pixel value. The dilation does the opposite of this as it tries to find local minimum over the area of kernel. With this the bright areas in the one or more sub-images may gets thinner whereas the dark areas may get thicker.

Upon applying the erosion and the dilation, the image processing module 216 may further sharpen the one or more sub-images with a two dimensional image sharpening filter with a median of 3×3 kernels. This step may help in sharpening the edges while removing the noise from the one or more sub-images. According to an embodiment of the present disclosure, the kernel used as the image sharpening filter may be as follows:

Image[*fx*][*fy*]=inputPixelValue[*x+fx*−edge*x*][*y+fy*−edge*y*],

Where the edgex=window width/2; and the edgey=window height/2

Subsequently, the image processing module 216 may be further configured for smoothening the one or more sub-images using a two dimensional smoothening filters with 3×3 Gaussian kernel. Using the Gaussian kernel may help in reducing the blur from the one or more sub-images which may be introduced due to motion of the image capturing unit 108. According to embodiments of present disclosure, the Gaussian function used is as below:

$$G(x, y) = \frac{1}{2\pi\sigma^2}e^{-\frac{x^2+y^2}{2\sigma^2}},$$

Where x is the distance from the origin in the horizontal axis and y is the distance from the origin in the vertical axis and σ is the standard deviation.

Subsequent to smoothening of the one or more sub-images and reducing the blur from the one or more sub-images, the detecting module 214 of the device 102 may detect a near object and a far object from the plurality of sub-images by extracting one or more features from the plurality of sub-images. The detecting module 214 may further simultaneously process each of the plurality of sub-images for computing gradient associated with the each of the plurality of sub-images based on the one or more features extracted. In one embodiment, three different window sizes may be processed simultaneously for computing the gradient associated with three different ROIs (ROI1, ROI2, and ROI3). According to embodiments, a one dimensional derivate mask may be scanned in both horizontal and vertical directions. Further, the intensity channel of the image data may be filtered using the following kernel:

$[-1, 0, 1]$ and $[-1, 0, 1]^T$.

Further, the detecting module 214 may create cell histograms by casting a weighted vote for an orientation based histogram channel based on the values associated with the gradient computed. The cell histograms comprises plurality of cells rectangular in shape and the histogram of channels are spaced over 180 degrees with unsigned gradient with nine histogram channels.

Further, the detecting module 214 of the device 102 may normalize the gradient strengths in order to reduce the effect of changes in illumination and contrast. For normalizing the gradient strengths, the cells of the plurality of cells may be grouped in spatial blocks. According to embodiments of the present disclosure, for each of the ROIs (sub-images) for which the gradient is computed, gradient value is divided into window size which is specific to the ROI. In one exemplary example, for the ROI1, 128×64 is used and gradient values is divided into 16×16 pixel block which in turn contains 4 cells of 8×8 pixels and each such cell in turn contain 9 histogram bin values. So finally 36 weighted bin values are computed which gets multiplied with 105 blocks creating 3780 descriptor values. Thus, doing this for each of the ROIs and window size in the way as discussed above, the detecting module 214 may significantly improve the speed of processing than the traditional way of computing the gradient for each window separately Further, by processing the three different window sizes simultaneously for computing the gradient associated with the three different ROIs, a concept of an enhanced histogram of oriented gradients (EHOG) is disclosed as per the present disclosure. Thus, the EHOG overcomes the limitation of Histogram of Oriented Gradients (HOG) i.e., processing only one window size at a time by processing the three different window sizes simultaneously. Further, the block normalization may be performed by the detecting module 214 using following normalizing factor:

$$L2 \text{ norm } f = \frac{v}{\sqrt{\|v\|_2^2 + e^2}}$$

After the normalization, the detecting module 214 of the device 102 may apply a Support Vector Machine (SVM) linear classifier on the plurality of sub-images in order to classify the near object and the far object in a category of a pedestrian or a vehicle. According to an embodiment, a SVM learning may be performed on samples containing images of objects of interest (for eg: vehicles) cropped to the size of the window sizes as discussed above. Further, the detecting module 214 may use following formulae for efficiently classify the one or more objects images simultaneously with each of the window size and each of the ROI.

$$Y_1 = \sum_{j=0}^{M_1-1}\left[\sum_{i=0}^{N-1} x_i y_i\right], Y_2 = \sum_{j=0}^{M_2-1}\left[\sum_{i=0}^{N-1} x_i y_i\right], Y_3 = \sum_{j=0}^{M_3-1}\left[\sum_{i=0}^{N-1} x_i y_i\right],$$

Where Xi is the feature vector of Histogram of Oriented Gradients (HOG), Yi is the feature vector of SVM trained data, N is number of samples per block, M1 is the number of blocks per window for 128×64, and M2 for 64×64 and M3 for 32×32 windows. The SVM trained data comprises predefined features associated with the objects categorized into predefined categories. When the objects (of which the image is captured by the image capturing unit 108) has to be detected and classified into the category, the SVM classifier compares the one or more features of the objects with the predefined features of the SVM trained data. Based on the comparison, the objects are detected as the near and the far object as well as the objects are categorized into the category. As with the above formula, 3 different scale windows are simultaneously processed for classification, it ensures multi scale classification of objects into the category (eg: pedestrian, vehicle) without major overhead on the computational complexity. It may be noted to a person skilled in art, that the objects may be classified into other categories (other than pedestrian or vehicle) based on the predefined features of the SVM trained data. For example, the predefined features for the category "pedestrian" may be hands, eyes, legs and the like. Similarly, the predefined features for the category "vehicle" may be number plate, wheels, steering and the like.

Figure 4:
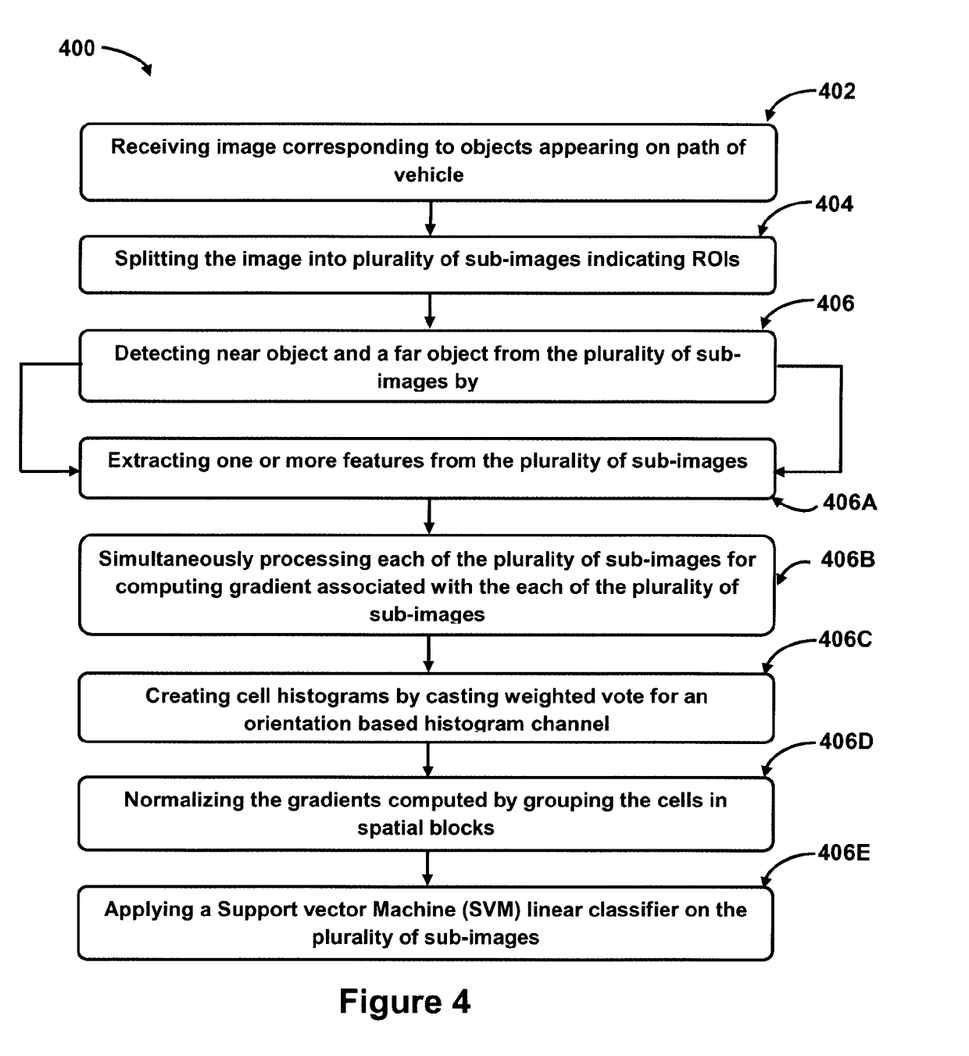
FIG. 4 illustrates a method for detecting the objects at multiple ranges, in accordance with an embodiment of the present disclosure.

Referring now to FIG. 4, method for detecting objects at multiple ranges simultaneously on a path of a vehicle is shown, in accordance with an embodiment of the present disclosure. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the disclosure described herein. Furthermore, the method can be implemented in any suitable hardware, software, firmware, or combination thereof. However, for ease of explanation, in the embodiments described below, the method 400 may be considered to be implemented in the above described device 102.

At block 402, image corresponding to objects appearing on the path of the vehicle may be received. The image received may be captured by an image capturing unit installed on the vehicle.

At block 404, the image received may be splitted into plurality of sub-images indicating region of interest (ROIs).

Further, each of the plurality of sub-images is in a form of a rectangular window of pixels computed based on distance of the objects from the vehicle. The plurality of sub-images may be further processed for reducing the noise from the images, isolating the individual elements from the images, joining the disconnected parts of the images, sharpening the edges of the images, and further smoothening the images using smoothening filters.

At block 406, the near and far object from the plurality of sub-images may be detected performing the steps shown in blocks 406A-406E.

At block 406A, one or more features may be extracted from the plurality of sub-images.

At block 406B, each of the plurality of sub-images may be simultaneously processed for computing gradient associated with each of the plurality of sub-images based on the one or more features extracted.

At block 406C, cell histograms comprising plurality of cells may be created by casting weighted vote for an orientation based histogram channel based on values associated with the gradient.

At block 406D, the gradients computed may be normalized by grouping the cells of the plurality of cells in spatial blocks in order to normalize the plurality of sub-images.

At block 406E, a Support vector Machine (SVM) linear classifier may be applied on the plurality of sub-images after being normalized in order to detect and classify the near object and the far object in a category.

Although implementations for methods and devices for detecting the objects have been described in language specific to structural features and/or methods, it is to be understood that the appended claims are not necessarily limited to the specific features or methods described. Rather, the specific features and methods are disclosed as examples of implementations for detecting the objects at near and a far distance simultaneously.

We claim:

1. A method for detecting objects at multiple ranges simultaneously on a path of a vehicle, the method comprising:
   receiving, by a processor, an image as an input corresponding to objects appearing on the path of the vehicle;
   splitting, by the processor, the image into a plurality of sub-images indicating region of interest (ROIs), wherein each of the plurality of sub-images is in a form of a rectangular window of pixel computed based on distance of the objects from the vehicle; and
   detecting, by the processor, a first object and a second object from the plurality of sub-images by
   extracting one or more features from the plurality of sub-images, simultaneously processing each of the plurality of sub-images for computing gradient associated with the each of the plurality of sub-images based on the one or more features extracted, wherein processing each of the plurality of sub-images includes:
   interpolating the one or more sub-images based on the distance of the first object and the second object from the vehicle; and
   applying erosion and dilation upon the one or more sub-images in order to reduce noise from the one or more sub-images, isolating individual elements of the one or more sub-images, and joining of disconnected parts in the one or more sub-images,
   creating cell histograms comprising plurality of cells by casting weighted vote for an orientation based histogram channel based on values associated with the gradient computed;
   normalizing the gradients computed by grouping the cells of the plurality of cells in spatial blocks in order to normalize the plurality of sub-images; and
   applying a Support vector Machine (SVM) linear classifier on the plurality of subimages after being normalized in order to detect and classify the first object and the second object in a category
   sharpening the one or more sub-images using a two dimensional image sharpening filter with a median of 3×3 kernels, and
   smoothening the one or more sub-images using two dimensional smoothening filters with 3×3 Gaussian kernel.

2. The method of claim 1, wherein the image is captured by one or more image capturing units of the vehicle.

3. The method of claim 1, wherein the first object and the second object is in range of X meter and N-X meter respectively, on a scale of 0 to N meter, from the vehicle.

4. The method of claim 1, wherein each sub-image of the plurality of sub-images is defined in a specific ROI based on predefined range of distance of the objects from the vehicle.

5. The method of claim 1, SVM linear classifier classifies the objects into the category using a formula:

$$Y_1 = \sum_{j=0}^{M_1-1}\left[\sum_{i=0}^{N-1} x_i y_i\right], Y_2 = \sum_{j=0}^{M_2-1}\left[\sum_{i=0}^{N-1} x_i y_i\right], Y_3 = \sum_{j=0}^{M_3-1}\left[\sum_{i=0}^{N-1} x_i y_i\right],$$

wherein Xi indicates a feature vector of Histogram of Gradients (HOG) and Yi indicates a feature vector of SVM trained data, and wherein the SVM trained data comprises predefined features associated with the objects categorized into a predefined categories, and wherein the classification further comprise comparing the one or more features with the predefined features of the SVM trained data.

6. A device (102) for detecting objects at multiple ranges simultaneously on a path of a vehicle, the device (102) comprising:
   a processor (202);
   a memory (206) coupled with the processor (202), wherein the processor(202) executes a plurality of modules (208) stored in the memory (206), and wherein the plurality of modules 208 comprises:
   a receiving module (210) to receive an image as an input corresponding to objects appearing on the path of the vehicle;
   a splitting module (212) to split the image into a plurality of sub-images indicating region of interest (ROIs), wherein each of the plurality of sub-images is in a form of a rectangular window of pixels computed based on distance of the objects from the vehicle; and
   a detecting module (214) to detect a first object and a second object from the plurality of sub-images by:
   extracting one or more features from the plurality of sub-images,
   simultaneously processing each of the plurality of sub-images for computing gradient associated with the each of the plurality of sub-images based on the one or more features extracted, wherein processing each of the plurality of sub-images includes:

interpolating the one or more sub-images based on the distance of the first object and the second object from the vehicle; and applying erosion and dilation upon the one or more sub-images in order to reduce noise from the one or more sub-images, isolating individual elements of the one or more sub-images, and joining of disconnected parts in the one or more sub-images;

creating cell histograms comprising plurality of cells by casting weighted vote for an orientation based histogram channel based on values associated with the gradient computed, normalizing the gradients computed by grouping the cells of the plurality of cells in spatial blocks in order to normalize the plurality of sub-images, and applying a Support vector Machine (SVM) linear classifier on the plurality of sub-images after being normalized in order to detect and classify the first object and the second object in a category.

sharpening the one or more sub-images using a two dimensional image sharpening filter with a median of 3×3 kernels, and smoothening the one or more sub-images using two dimensional smoothening filters with 3×3 Gaussian kernel.

7. The device (102) of claim 6, wherein the image is captured by one or more image capturing units of the vehicle.

8. The device (102) of claim 6, wherein the first object and the second object is in range of X meter and N-X meter respectively, on a scale of 0 to N meter, from the vehicle.

9. The device (102) of claim 6, wherein each sub-image of the plurality of subimages is defined in a specific ROI based on predefined range of distance of the objects from the vehicle, wherein the distance of the object up to 20 meters falls under ROI.

10. A non-transitory computer readable medium embodying a program executable in a computing device for detecting objects at multiple ranges simultaneously on a path of a vehicle, the program comprising:

a program code for receiving an image as an input corresponding to objects appearing on the path of the vehicle;

a program code for splitting the image into a plurality of sub-images indicating region of interest (ROIs), wherein each of the plurality of sub-images is in a form of a rectangular window of pixels computed based on distance of the objects from the vehicle; and a program code for detecting a first object and a second object from the plurality of sub-images by extracting one or more features from the plurality of sub-images, simultaneously processing each of the plurality of sub-images for computing simultaneously processing each of the plurality of sub-images for computing gradient associated with the each of the plurality of sub-images based on the one or more features extracted, wherein processing each of the plurality of sub-images includes:

interpolating the one or more sub-images based on the distance of the first object and the second object from the vehicle; and applying erosion and dilation upon the one or more sub-images in order to reduce noise from the one or more sub-images, isolating individual elements of the one or more sub-images, and joining of disconnected parts in the one or more sub-images;

creating cell histograms comprising plurality of cells by casting weighted vote for an orientation based histogram channel based on values associated with the gradient computed, normalizing the gradients computed by grouping the cells of the plurality of cells in spatial blocks in order to normalize the plurality of sub-images, and applying a Support vector Machine (SVM) linear classifier on the plurality of sub-images after being normalized in order to detect and classify the first object and the second object in a category.

sharpening the one or more sub-images using a two dimensional image sharpening filter with a median of 3×3 kernels, and smoothening the one or more sub-images using two dimensional smoothening filters with 3×3 Gaussian kernel.

\* \* \* \* \*